Figure 1:
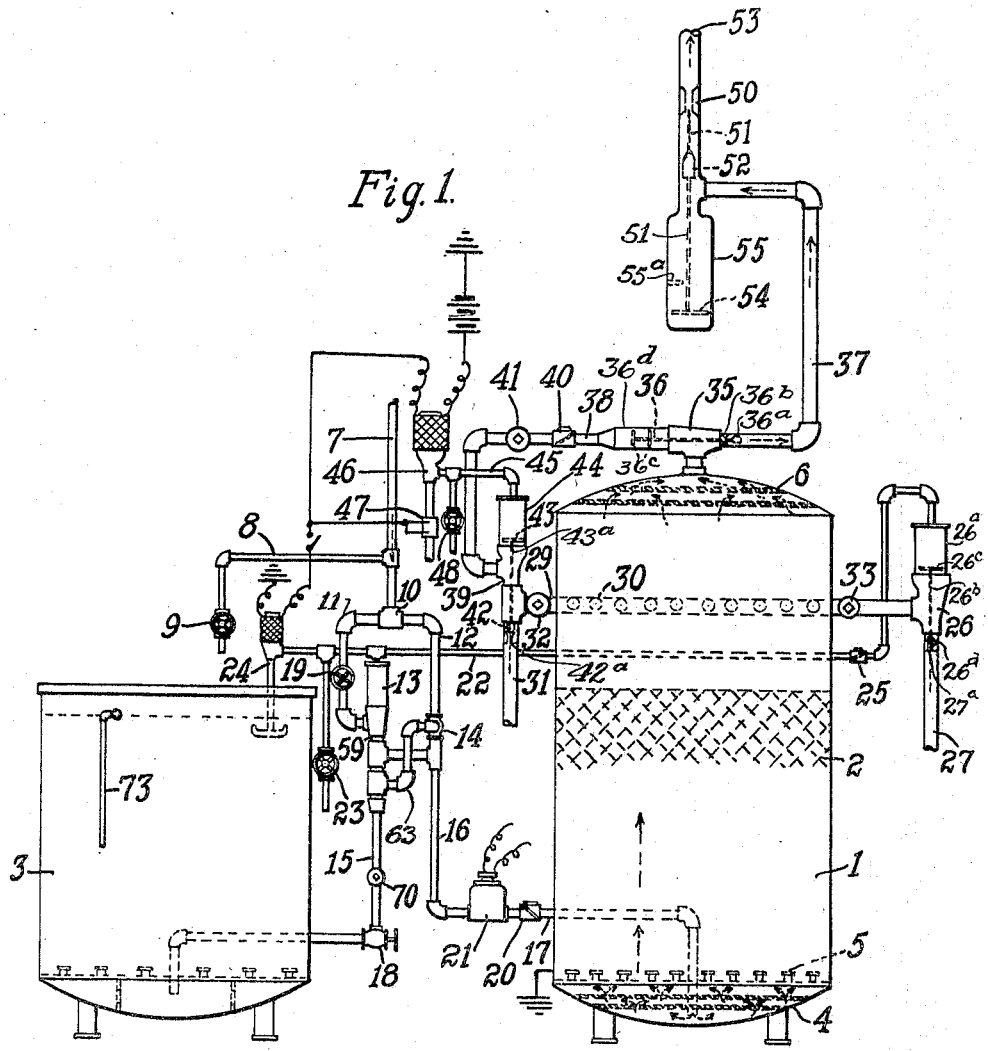

Oct. 9, 1934.   A. J. DOTTERWEICH   1,976,439
WATER SOFTENING APPARATUS
Filed Sept. 20, 1928   2 Sheets-Sheet 2

Patented Oct. 9, 1934

1,976,439

UNITED STATES PATENT OFFICE 1,976,439

WATER SOFTENING APPARATUS

Andrew J. Dotterweich, Pittsburgh, Pa., assignor, by mesne assignments, to General Water Treatment Corporation, New York, N. Y., a corporation of Delaware Application September 20, 1928, Serial No. 307,097

20 Claims. (Cl. 210—24)

This invention relates to water softening apparatus of the type employing zeolite as a softening agent, and it is among the objects thereof to provide apparatus which shall be adapted to supply softened water in relatively large quantities, and which shall be adapted to regenerate the softening material in an efficient manner.

Another object of the invention is to provide for drawing softened water at a rate of flow greatly in excess of the normal flow rate of the apparatus for a relatively short period of time and to automatically reduce the flow to the rated capacity of the softener.

Another object is to provide a water softening process which shall effect complete regeneration so as to remove all traces of salt from the softening material.

Another object of this invention is to provide means that will prevent back flow from the softener which would cause trouble when water is withdrawn from the softener at other points than at the drain or delivery point.

In describing the invention it is necessary to consider the factors which affect the design and operation of the type of equipment which will be referred to in the following. As a first consideration—it is known that to effect the regeneration of a water softener, salt is preferably applied to the zeolite at a low rate of flow at a certain fixed concentration to cause an efficient exchange. After the application of salt, the salt or brine is flushed out at a rate of flow considerably faster than the rate of application, but not at a rate equal to the rate at which the zeolite will soften the water.

As a second consideration—with water being applied to the zeolite in an upward direction, there is what is known as expansion of the zeolite bed, this expansion being, to a certain extent, in proportion to the rate of flow of the water passing up through the zeolite. For example, when applying water is an upward direction through green sand with a flow rate of eight gallons per square foot per minute, the original depth of the bed is expanded to a distance which is equivalent to about 50% of the depth of the bed. With lesser flow rates the expansion is considerably less.

A third consideration—any zeolite has what is known as a salt lag, that is, on apparent completion of a regeneration, the zeolite itself has a tendency to retain some salt with it for a while after regeneration is completed, according to the soap test, and upon delivery of the softened water, the zeolite gradually releases such retained salt in minute quantities to the softened water. It may be hardly perceptible, but in some instances may be a serious detriment. Such release of salt lasts possibly as long as one quarter of the soft water capacity of the softener.

A fourth consideration—the construction of the softening equipment regarding a volumetric space above the zeolite can serve four purposes: First, to provide a space into which the zeolite can expand on having the water applied in an upward direction as is the case where a screen is not used; second, as a means of measuring the amount of salt in solution used in the regeneration process; third, as a means of removing the salt from the zeolite more thoroughly, or to prevent the salt lag above described; and fourth, when salting and flushing are done in an upward direction, the space retards the flow of brine from the softener during the regeneration periods, due to a dilution action necessary with fresh water in displacing the salt solution so as to remove the salt or brine from the container towards completion of the regeneration where means are not employed to reduce the tendency to this objectionable feature.

With reference to this fourth purpose—if it is desirable to soften water at high rates of flow, it is essential that there is sufficient free board space in the softener to prevent the zeolite from carrying over. Since increased volumetric space above the zeolite retards the withdrawal of brine from the softener during the regeneration, I have found it quite practical to partly withdraw the salt solution at a place just above the point to which the zeolite will expand during the flushing out process. This point is somewhat below the top outlet from the softener and further since this intermediate position of withdrawal is not employed in the system during the period of softening water, it is immaterial whether this collector is embedded in the zeolite during its expansion at high rates of flow.

As the removal of salt from the softener, above the zeolite, depends, to a considerable extent, upon the volumetric space above this zeolite which must be displaced several times before the salt is completely flushed out, it follows that this volumetric space should be as small as possible. With the lesser volume, however, the rate of flow during the softening period is also reduced.

As this application refers principally to water softening equipment in which softening, salting and flushing are all done in an upward direction, my descriptions shall be drawn to the type of softener having a free board space above the zeolite. It is not my intent or purpose, however, to limit this application to this particular construction of softener, as the process of removal of salt from the softener is the same regardless of whether or not a mineral retaining screen is used.

All kinds of zeolite used in water softeners have similar characteristics in regard to expansion of the bed and the salt lag described above, and I shall hereinafter simply refer to zeolite having in mind any zeolite, whether it be natural or artificial, which would be used within the softener.

Figure 2:
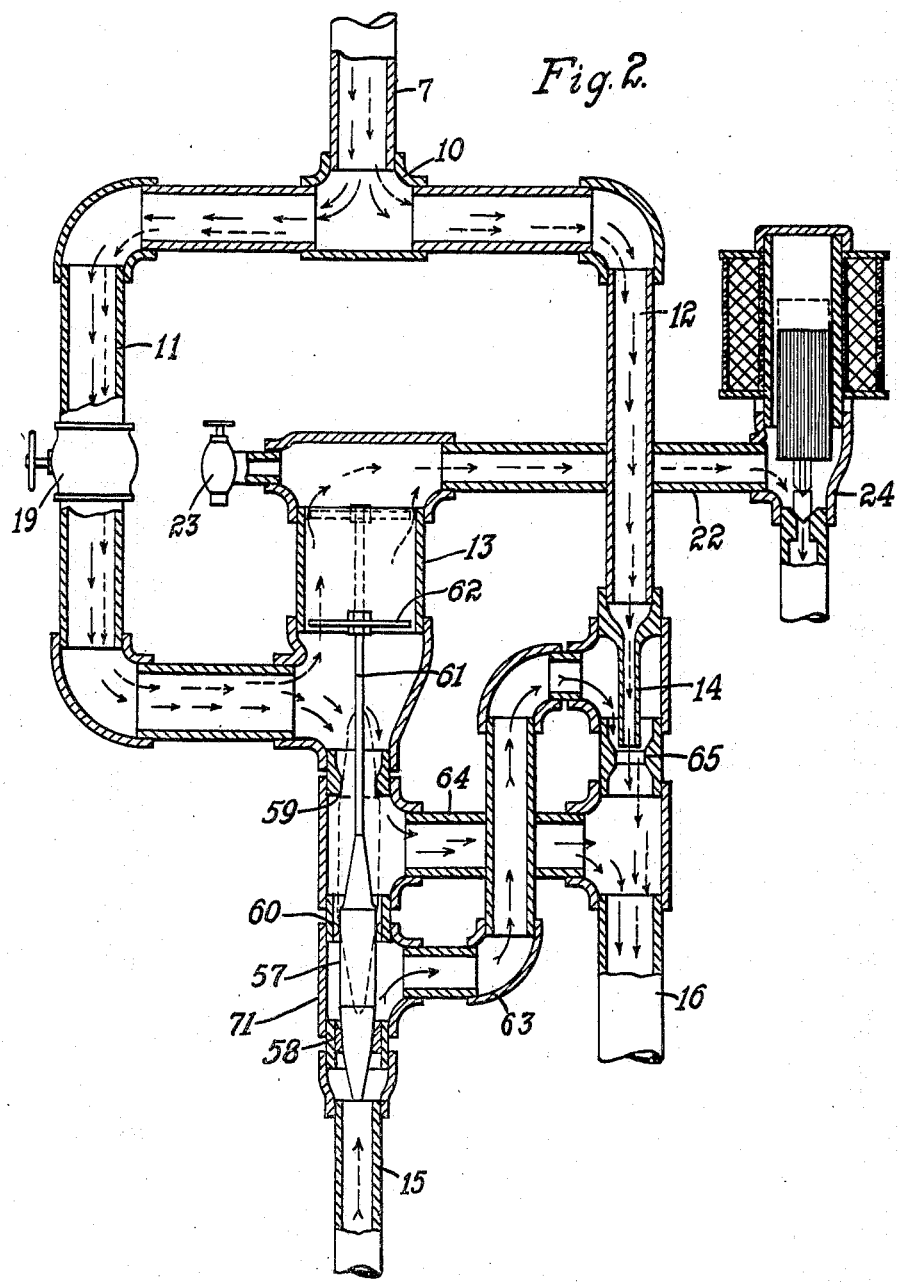

To carry out the objects of the invention, I employ apparatus illustrated in the accompanying drawings constituting a part hereof and in which Figure 1 is a diagrammatic view of softening apparatus embodying the principles of this invention; and Figure 2 is an enlarged detail view of the salt control piping system employed in connection with the operation of the apparatus shown in Figure 1.

In the drawings like reference characters designate like parts and in Figure 1 the numeral 1 designates a softening tank for holding zeolite indicated at 2 and a brine tank 3 which contains a salt solution employed for regenerating the zeolite bed of the tank 1. The softening tank is provided with distributing means consisting of baffle plates 4 and strainer nozzles 5 which constitute a distributing system for equalizing the flow of water from the bottom of the tank uniformly through the zeolite bed in a series of paths of uniform length whereby the zeolite material is uniformly active in softening the water passing through the tank. The upper portion of the tank is similarly provided with baffle members 6 having perforations forming paths which cooperate with the strainer nozzles 5 at the bottom of the tank to establish vertical paths through the zeolite bed.

The bottom of the softening tank constitutes the inlet for the hard water and the regenerating solution and the top constitutes the outlet or delivery side of the tank through which the softened water passes to the point of use or from which a portion of the brine solution is drained in a manner to be hereinafter explained.

Numeral 7 designates a supply pipe leading from a source of raw water and 8 a branch pipe disposed above brine tank 3 for supplying water to be operated by a hand valve 9, this valve being used as hereinafter described. The supply pipe 7 is connected farther down to a T connection 10 which has branches 11 and 12 causing water to take a divided path in branch 11 passing through a valve 19 and thence over to pipe 16. In branch pipe 12 the water passes through an ejector nozzle and thence to line 16. From 16 the water passes through a water meter 21, a check valve 20, through inlet pipe 17 to the softener. It will be noted that the softener, illustrated herein, does not have in the lower portion of the tank a gravel bed as is common with other types of softeners. This gravel bed is omitted for the purpose of having this space filled with zeolite rather than gravel as it is possible to secure much greater capacity for a given size of softener tank. If the gravel bed is omitted there will be difficulties regarding the zeolite passing down through the strainer nozzles into the space below the strainer plate at such times when water is withdrawn from the softener at points other than above the zeolite bed, that is withdrawing water or releasing the pressure on the softener tank at some place prior to the point where water enters this tank.

I wish to point out that a steel tank of any given construction has a certain elasticity which causes the tank to expand when under pressure and to contract upon the releasing of such pressure. For example, a tank holding one hundred gallons at atmospheric pressure may be assumed. Upon the closing of all outlets from the tank, the water admitted will increase the pressure within the tank to one hundred pounds and a gallon or more of water can be forced into the tank before a gauge would register this pressure. If the outlet from this tank were opened the gallon of water can be withdrawn before the pressure is atmospheric. This gallon of water introduced and then withdrawn represents the expansion or increase in volume of the tank due to the application of pressure.

In the instance where the use of gravel within a water softener is dispensed with, I have found that with the zeolite resting directly on the strainer plate, it is possible when withdrawing water from the inlet line 17 with the relieving of pressure by the opening of a valve connected to 17, the softener tank in contracting forces zeolite through the strainer nozzle, the amount of water passing in this direction being equal to the volume necessary to be introduced into the softener tank from the contracted to the expanded condition. To prevent any such back flow, I am inserting a check valve 20 which serves the purpose of preventing such a difficulty and further permits the use of more zeolite in the softener tank than under conditions where a gravel bed is used.

The valve casing 13 is connected to a pipe line 22 which is controlled by a manually operated valve 23 or a solenoid operated valve 24 for a purpose to be hereinafter explained. The line 22 is provided with a check valve 25 which prevents back flow of fluid through a cylinder 26a and a valve chamber 26 leading to a drain 27. A valve rod 26b in chamber 26 carries at its lower end a valve member 26d cooperating with a seat 27a, and at its upper end a piston element 26c disposed in the cylinder 26a with a certain amount of clearance between its periphery and the inside wall of the cylinder.

As previously explained, it is intended to drain off the salt solution at a point adjacent the zeolite bed as well as at the top of the softening tank, and this is accomplished by the use of a drain line 29 having suitable outlets 30 which line is connected at one end to the drain 27 and at its other end to a drain 31, the respective ends of the line 29 being controlled by valves 32 and 33. The outlet of the softening tank is provided with a T connection 35 forming part of a valve housing in which a valve rod 36 is disposed which carries a valve member 36 adapted to close the passage 36b leading to the service line 37 while the softening material is being regenerated. Fitted to the T connection 35 is a cylinder 36d connected with a line 38 leading to the drain 31 through a valve chamber 39. A pair of piston members 36c is attached to valve rod 36, a certain amount of clearance being provided between the periphery of members 36c and the inside wall of cylinder 36d. A check valve 40 prevents any back flow through line 38 to the tank 1 and a manually controlled valve 41 is provided to adjust the rate of flow from the tank through the line 38. The valve casing 39 houses a valve 42 and seat 42a that control the drain passage 31, this valve 42 being connected by means of rod 43a with a piston element 43 operating in a cylinder 44, a certain amount of clearance being provided between the periphery of element 43 and the inside wall of cylinder 44 which is connected by a pipe 45 to a solenoid operated valve 46 which is controlled by electrodes 47 through which an electric circuit is established or broken in accordance with the character of the solution passing therethrough. The construction of valve 46 is substantially the same as that of valve 24 (see Figure 2). A hand operated valve 48 is provided when it is desired to initiate a flow through the drain independent of the electrically operated mechanism.

The principle of the valve mechanism contained in valves 35, 26, 46 and 39 has been given description in applicant's copending application, Serial No. 202,842, filed July 1, 1927, and electrically operated means responsive to the electrical conductivity of a fluid passing through a softener have been disclosed in my copending applications, Serial No. 687,340, filed January 19, 1924 and Serial No. 724,804, filed July 8, 1924.

The permissible rate of flow through the softening tank is, as previously explained, dependent upon the amount of space above the zeolite bed which permits expansion of the bed in accordance with the mechanical action of the water thereon passing from the inlet at the bottom to the outlet at the top of the tank. When the zeolite bed is at rest and it is desired to obtain a maximum flow through the service line 37, it is possible to secure a volume of water in excess of the normal rating of the softening apparatus provided the flow can be checked when the zeolite bed has expanded into the free board space of the tank.

To provide for this, I employ a restricted nozzle 50 which is controlled by a plunger 51 that has a float or piston element 52 secured thereto, which is disposed in the path of the water passing through the service line 37 to the point of use at 53. A piston element 54 is secured to the lower end of the plunger 51 and is movable in a cylindrical casing 55 in which it is loosely fitted to produce a dash pot effect. A stop 55a attached to the inside of the casing 55 cooperates with piston 54 in such manner as to prevent the rising of the element 52 to a point where it would close the nozzle 50.

When the line at the delivery end 53 is opened, sufficient water will be free to pass through the nozzle 50 without restraint and the rush of water will act upon the float 52 to raise it against the slowly yielding resistance of the dash pot element 54. During the period when the plunger 51 is rising and before it has entered the nozzle element 50, the peak flow or a maximum volume of water will pass to the point of use, and this is checked by the plunger 51 passing into the nozzle 50, thereby reducing the passage to deliver a volume equal to that for which the softening apparatus is designed.

The time lag between when the service line is fully open to deliver softened water at a maximum rate of flow and when the nozzle 50 is restricted by the plunger 51 is designed to correspond to the time in which the zeolite is expanded to its maximum within the softening tank, and in this manner a rate of peak flow of 100 percent in excess of the maximum flow of the softener may be obtained. When the water is shut off at 53 the member constituting the elements 51, 52 and 54 drops by action of gravity and the passage is again open for temporary increased rate of flow.

In Figure 2 is shown an enlarged detail view of the brine and softening tank connecting system and the flow of the salt solution and raw water supply is therein diagrammatically illustrated. As shown in Figure 2, the raw water supply pipe 7 is adapted to supply water through the branch lines 11 and 12 leading to the valve chamber 13 and the ejector nozzle 14 respectively. In the chamber 13 is disposed a double seating valve 57 adapted to seat at 58 and 59 to control passages leading to the salt line 15 and to the raw water supply respectively. The valve 57 slides in a guide 60 in which it is loosely mounted and the valve is connected by a stem 61 with a leaking piston 62 which operates in the casing 13. A branch line 63 connects the salt line 15 with the pipe line 16 leading to the softening tank and a branch line 64 forms a direct passage from the valve chamber to the pipe 16. The ejector nozzle 14 projects into a constricted portion 65 of the line 16 for the purpose of drawing salt solution from the line 63 into the main inlet passage of the softening tank.

With one method of operation of the softener, valve 32 remains permanently closed and valve 33 wide open. During softening, valves 23 and 48 are closed, and the water flows from pipe 7, through pipes 11 and 12, pipes 16, 17, then through the zeolite 2, thereby being softened, and to service via connection 35 and pipes 37 and 53.

Upon completion of the softening operation, valves 48 and 23 are opened manually, for the purpose of regenerating the zeolite. The opening of valve 48 connects the top of cylinder 44 to the atmosphere. Due to the small clearance between piston 43 and cylinder 44 the pressure below piston 43 is higher than it is above piston 43 so that the piston 43 is forced upwardly, thereby lifting valve 42 from its seat 42a. Thereby the left hand side of cylinder 36d is connected to the drain 31. Due to the small clearance between the piston members 36c and the cylinder 36d a higher pressure is maintained on the right hand side of the piston members 36c than on their left hand side. This pressure difference forces the piston members 36c to the left, thereby pulling the valve member 36a against the seat 36b and shutting off the flow from tank 1 to the service line 37.

Upon closing of valve 48 the pressure on both sides of piston 43 becomes equalized, and the piston 43 falls by gravity until valve member 42 rests on seat 42a, shutting off the flow from chamber 39 to drain 31. Thereupon the pressure on both sides of the piston members 36c becomes equalized, and since the pressure in the service line 37 is lower than in the T connection 35, the valve member 36a is forced away from seat 36b towards the right, thereby re-establishing connection between tank 1 and the service pipe 37.

The opening of valve 23 connects the top of cylinder 26a and casing 13 to the atmosphere. The pressure differential thereby created, forces the piston 26c up, lifting valve 26d from its seat 27a and establishing connection between the collector 30 and the drain 27. The piston 62 is likewise lifted, closing valve 59 and opening valve 58. Upon closing valve 23 the pressure difference in chamber 13 and cylinder 26a is equalized and the piston members 62 and 26c fall by gravity, opening valve 59 and closing valves 58 and 26d.

With valves 23 and 48 open, raw water will pass through 7, 12, and ejector 14, carrying a salt solution through 16 and eventually up through the zeolite and thence in divided paths leading to the drain—one path being through collecting system 30 and valve 26, the other path over T connection 35, check valve 40, flow regulating valve 41, and eventually to the drain at 31.

Upon withdrawal of the desired amount of salt from the tank 3, valve 23 is closed which causes valves 26 and 58 to close and valve 59 to open permitting flushing out water to pass from pipe 7 through the divided paths 11 and 12, thence through 16 to the bottom of the softener up through the zeolite and out through the single opening 35 to the drain at 31. With all of the brine flushed out, valve 48 is closed which causes valve 39 to close and the soft water to pass through 37 and 53 to use.

In the pilot pipe line 22 there is placed a check valve 25, the purpose of which is to prevent a flow from 7 leading to piston 13, thence through 22, through leaky piston in valve 26, thence through collector 30 and to the soft water outlet at 53, which would constitute an undesirable intermingling of raw water with the softened water, both previously mentioned.

It will be noted in the above description that the flow through collecting system 30 to the drain at 27 was continued only during the period of salting which condition is quite desirable with certain types of zeolite responding to a quick exchange and having less salt lag than other zeolites, removing through 27 a greater portion of the brine prior to the closing of valve 26 and which zeolites are better adapted to be flushed out at high rates of flow.

In case it is desired to use zeolite which can be more efficiently regenerated by passing the salt through at a low rate of flow and then flush out at a higher rate of flow, but at a rate much less than the softening rate and further which is better adapted to have a regeneration material passed through at a low concentration in solution, the amount of salt necessary to regenerate such zeolite being introduced in a volume of water considerably in excess of the volume contained within the softener tank less the space occupied by the zeolite, valve 33 remains permanently closed and valve 32 opened.

Assuming that it is desired to regenerate the softener under these conditions and with this different type of zeolite using the electrically controlled system in preference to the manually operated valves 48 and 23, electric current from a suitable source is used to energize the solenoid operating valve 46 and solenoid controlling valve 24. Valve 46 being arranged parallel to valve 48, and valve 24 parallel to valve 23, the opening or closing of valves 46 and 24 causes the same functions as the opening and closing of valves 48 and 23 described above.

Under these conditions, water will flow through 7, 12 and ejector 14 drawing brine through pipe 15 and carrying a diluted salt solution through check valve 20 thence into the lower distributing system through pipe 17, up through the zeolite, taking a divided path to the drain—the first path leading through 30, valve 32, valve 42, to the drain at 31; the other path being up to the T outlet 35, through check valve 40, flow controlling valve 41, compartment 39, and thence through valve 42 and also to the drain at 31.

It will be noted that the path leading from the upper part of the tank leads into a casing 39 above the valve 42, the reason for this connection being that in the forepart of the salt application period the brine will pass up through the zeolite, and a part of it will pass through collector 30 direct to valve 42 and to the drain during which time fresh water will still be passing out at the top connection 35 to the casing 39 and thence to the drain.

If the water from the upper part of the softener tank passing out through 35 were connected to the chamber directly above valve 42, there would be an intermingling of brine from collector 30 and water from this upper connection resulting in brine water passing up through cylinder member 44 and thence over through line 45 to electrodes 47 placed in this line for purpose of terminating the salting operation. With a connection as shown even though there is a brine solution commencing to pass through collector 30 to the drain at 31, at the same time fresh water is still passing down from 35 through the upper casing 39, part of which water passes downwardly through 42 and to the drain at 31 and part of which operating the piston in cylinder 44, passes up and over to valve 46 and thence through electrodes 47 into the drain.

Under such conditions the electrically controlled apparatus tends to continue the salting operation due to fresh water passing through electrodes 47. Eventually, however, the brine water will also pass out through 35 and over to casing 39, part of which brine passes downwardly together with the brine coming from the collector 30 to the drain at 31; and the other part, up through cylinder 44 to 46 and through 47 into the drain.

The electrical conductivity of the brine passing through electrode 47 causes the solenoid, controlling valve 24, to become de-energized and accordingly with the closing of valve 24, valve passage 59 opens, as will be hereinafter described, leaving valve 46 opened as long as there is a brine solution passing to the drain through the electrode 47.

With the opening of valve 59, the hard water takes a divided path through branches 11 and 12 leading to pipe 16 and thence into the softener tank through pipe 17 passing upwardly through the zeolite and again taking a divided path as heretofore described.

The position of collector system 30 is at a place just above the point to which the zeolite will expand during the flushing operation and accordingly, will carry no zeolite to the drain even though it is totally embedded in the zeolite during the softening operation.

In the line leading from the top of the softener is located a check valve 40 whose purpose is to prevent an undesirable flow from within the softening tank during the softening period through valve 32 chamber 39, flow regulating valve 41, pipe 38, and thence combining with the water passing out of the softener at the top of the tank to the point of use, which would carry with it zeolite in suspension during a period when the zeolite is expanded up to collector 30. With a check valve 40 so seated against a flow in that direction, all water passing from the softener passes out through T 35 to use. In the line 38 is also connected a flow controlling valve 41, the purpose of which is to adjust the ratio of water passing from within the softener tank through 30, valve 32, and to the drain at 31 as compared with the water passing out at 35, through 38, valve 41, and to the drain at 31.

It is obvious that if valve 41 were opened entirely and with the two paths to the drain having apparently the same frictional resistance, that the flow of water from the softener will be divided quite evenly through both of these paths to the drain. If valve 41 were partially closed the greater portion of the water passing to the drain at 31 will be from within the softener through the collector 30 and vice versa if valve 32 were partially closed and valve 41 opened completely, the greater volume of brine passing from within the softener will pass to the drain at 31 through line 38.

With the above in view, it is apparent that a considerable portion of the brine introduced into the softener can be made to pass to the drain at 31 through collector 30 considerably in advance of any brine passing to the drain at 31 through T 35 and pipe 38.

In connection with drawing off the brine, as above described, towards the end of the flushing, fresh water will be passing out through collector 30 to the drain at 31 whereas a briny water is held within the softener tank above the level of collector 30 to be let out slowly through the top at 35 and to the drain at 31 as well as to the electrode 47. With such a condition, it is apparent that fresh water passing through the zeolite will thoroughly flush the salt from the zeolite and prevent a salt lag as was heretofore described, that is, fresh water is in reality flushing out the zeolite completely while briny water is still being drawn from the upper part of the casing to the drain, thus assuring the zeolite being flushed free from salt.

Eventually while fresh water is still passing out through 30, fresh or soft water will also pass out at 35 to the drain at 31 and to the electrode at 47. With the fresh or softened water passing out through electrode 47 the circuit is broken, fresh water being a poor conductor of electricity, and valve 46 will close. With the closing of valve 46, soft water will pass through T 35 to use at 53.

Referring to Figure 2: Piston member 62 is contained within a cylinder wall 13 and is operative to the position in the dotted lines under conditions when either valve 23 or valve 24 are opened permitting water to pass around this piston and in so doing to draw it to its uppermost position carrying with it, by means of rod 61, the valve member 57, closing valve seat 59 and further when in this uppermost position, this valve member 57 also opens the seat 58 which permits the entry of brine from the brine tank through pipe 15 and flow controlling valve 70.

With the closing of both valves 23 and 24, there being no flow of water to these outlets, there will be nothing to hold piston member 62 in its uppermost position, with the result that gravity plus internal pressure against valve 57, will force the latter downwardly opening the valve seat at 59 and closing the brine inlet at 58.

In the line 12 leading to pipe 16 is inserted an ejector 14 which draws salt up through valve 58, pipe 63, and thence through the choke at 65. In operation, during softening period, valve member 57 is against its seat 58 preventing the flow downwardly of water under pressure within piping the system to the drain and obviously because of the greater internal pressure within the piping system, brine cannot enter at point 58. Under these conditions, fresh water enters at 7, passes to T 10, takes a divided path—one through path 11, past valve seat 59, and thence over to 16; the other path being through pipe 12 to within the ejector 14 through nozzle 65 and thence also to 16 leading eventually to the softener.

It being desired to regenerate or apply salt solution, either valve 23 or 24 is opened after which some water may pass through path 11 up past piston member 62 preferable to valve 24 leading into the brine tank. With the water passing in this direction, piston member 62 will be lifted causing members 57 to be drawn against seat 59 and thus closing port 59. With port 59 closed water is forced through pipe 12 under greater pressure, because of the closing of port 59 and because of this greater pressure, the velocity of the water passing through the ejector nozzle draws the salt solution up from the brine tank past seat 58 through piping 63 thence through nozzle 65 from which point the salt solution is passed through pipe 16 to the softener.

In the salting operation due to water pressure in pipe 64 being in excess of the pressure within piping 15 and connecting T 71, I have found that the water will work through 64 into T 71 and thence instead of carrying the brine over, water is circulated within the piping. To overcome this difficulty, I have inserted guide 60 which is more or less close fitting to member 57 and whose purpose is to prevent such a re-circulating of water.

A manually adjustable control valve 70 is placed in the pipe line 15 leading from the brine tank 3 to the ejector outlet or choke 65. This control valve 70 enables the operator to increase or decrease the rate at which brine is drawn by the ejector, and since the brine is mixed with water flowing at a substantially constant rate through the ejector nozzle 14, the concentration of the brine discharged by the ejector may thus be so adjusted as to result in most efficient regeneration of the particular type of zeolite used.

In the path leading through pipe 11, I have inserted a flow controlling valve 19 which permits adjustment of the rate of flow to the softener so that the water passing through the zeolite will not pass at a higher rate than that which would carry zeolite over.

During the salting operation, water is discharged directly into the salt tank through valve 24 in a volume per minute slightly in excess of the volume per minute of salt solution withdrawn from the salt tank through line 15; such excess of water discharges through the overflow pipe 73, keeping the level of water in the brine tank always the same and further with such an arrangement I eliminate floats and other valve mechanism now quite commonly in use.

In a manually operated softener, valve 23 is opened which causes a salt solution to be drawn from the salt tank and by the measurement of the volume, withdrawn from the salt tank, it can be determined exactly how many pounds of salt have been withdrawn for regenerating of the zeolite and upon the completion of the salting operation, valve 9 can be opened to refill the salt tank.

In lieu of the above filling of the brine tank through valve 9, if the softener tank is under sufficient pressure, valve 23 can be opened which will cause piston member 62 to rise and open valve seat 58, permitting water under pressure to follow the path from 7 through 12 into nozzle 14 and thence reverse back through pipe 63 past valve seat 58 and downward, pipe 15 refilling the salt tank from the bottom.

In Figure 2 I have made use of arrows to indicate the flow through this system of piping— the full arrows indicating the flow during softening process, and the broken arrows indicating the flow during the salting and flushing periods.

It is evident from the foregoing description of this invention that softening apparatus constructed in accordance therewith provides for a maximum flow of softened water, permits efficient salting of the softening material during regeneration thereof and using less regenerating water.

Although one embodiment of this invention has been herein illustrated and described, it will be obvious to those skilled in the art that various modifications may be made in the details of construction and in the arrangement of several cooperating parts without departing from the principles herein set forth.

I claim:

1. Water softening apparatus comprising a tank adapted to be partially filled with a softening material and having an inlet and an outlet passage at the bottom and top thereof, a drain disposed in the free board space above the zeolite bed and below the outlet passage at the top of the tank, a connection for joining the outlet passage and the drain and means for regulating the relative flow of fluid through said drain and outlet passage.

2. Water softening apparatus comprising a tank adapted to be partially filled with a softening material and having an inlet and an outlet passage at the bottom and top thereof, a drain disposed in the free board space above the zeolite bed and below the outlet passage at the top of the tank, a connection for joining the outlet passage and the drain and a valve for controlling the drain passage, electrically operated means for regulating said valve and electric means for bringing said valve to its normal position.

3. In a water softening apparatus a softening tank adapted to be partially filled with a softening material and having a service line leading therefrom for delivering softened water to the point of use, said service line being provided with a restricted portion forming a passage and a plunger member movable in response to the water flowing in said line for controlling the size of opening in said restricted passage.

4. Softening apparatus comprising a tank adapted to be partially filled with a softening material and having an inlet at the bottom thereof and an outlet passage at the top thereof, said outlet passage connecting with a service line for softened water and with a drain, and a valve for regulating the flow from the tank to the service line or drain, a second drain disposed above the bed of softening material and below the outlet passage at the top of the tank and a passage connecting the salt drain with the drain passage at the outlet of the softening tank.

5. A water softening apparatus comprising a softening tank having an outlet at the top thereof and having a drain below the outlet, a bypass connecting said outlet and drain, a valve disposed in the drain line and adapted to be actuated by fluid flowing through said bypass and means for automatically cutting off the flow of fluid from the outlet to the point of use and directing the same through the bypass connection to said drain when the drain controlling passage is open.

6. Water softening apparatus comprising a softening tank adapted to be partially filled with softening material and having an outlet passage for delivering softened water to the point of use, and means connected in said passage for temporarily permitting the flow of softened water from the tank greatly in excess of the normal maximum rate permissible for the apparatus, said means being responsive to the velocity of the water flowing through said outlet passage to control the duration of the abnormal flow of softened water.

7. Water softening apparatus comprising in combination a softening tank, a brine tank, a system of piping therefor, a plurality of drains connected with the softening tank for draining the regenerating solution therefrom, an independent outlet provided at the top of the tank, a bypass connecting said outlet to one of the drains, valves controlling the drains and the outlet passage, electrically operated means for controlling said drain valves to open the same, and electrically operated means for closing said valves.

8. Water softening apparatus comprising in combination a softening tank, a brine tank, a system of piping therefor, a drain for taking off the brine solution from the softening tank, an outlet at the top of said tank independent of said drain, a valve controlling the brine drain, and a solenoid actuated valve for controlling the drain valve, an independent valve for controlling the flow of brine from the brine tank and a solenoid actuated valve for controlling said brine controlling valve, and means responsive to the character of the fluid flowing through the passage controlled by said first named solenoid actuated valve for controlling said brine controlling valve.

9. A water softener having a water supply pipe and brine supplying means in connection with the receiving end of the softener and service and drain pipes in connection with its delivery end, valve means for controlling the admission of brine to the softener, valve means for controlling the discharge from the softener to the service pipe during normal softening operation and to the drain pipe during regeneration and flushing, another drain connection with the softener between the softening means and delivery end of the softener, valve-means controlling discharge through the last mentioned drain connection, and means controlling the last named valve means to open the drain connection thereby controlled when brine is supplied to the softener and to close the same when the flow of brine to the softener ceases.

10. A water softener having a water supply pipe and brine supplying means in connection with the receiving end of the softener and service and drain pipes in connection with its delivery end, valve means for controlling the admission of brine to the softener, valve means for controlling the discharge from the softener to the service pipe during normal softening operation and to the drain pipe during regeneration and flushing, another drain connection with the softener between the softening means and delivery end of the softener, valve-means controlling discharge through the last mentioned drain connection, and means controlling the last named valve means to open the drain connection thereby controlled when brine is supplied to the softener and to close the same when the flow of brine to the softener ceases, and further valve means for regulating the relative flows to the drain from the delivery end of the softener and through said other connection.

11. A water softener having a water supply pipe and brine supplying means in connection with the receiving end of the softener and service and drain pipes in connection with its delivery end, valve means for controlling the admission of brine to the softener, valve means for controlling the discharge from the softener to the service pipe during normal softening operation and to the drain pipe during regeneration and flushing, another drain connection with the softener between the softening means and delivery end of the softener, and valve means controlling both drain connections for simultaneously starting and stopping flow to the drain from the delivery end of the softener and through said other connection.

12. A water softener having a water supply pipe and brine supplying means in connection with the receiving end of the softener and service and drain pipes in connection with its delivery end, valve means for controlling the admission of brine to the softener, valve means for controlling the discharge from the softener to the service pipe during normal softening operation and to the drain pipe during regeneration and flushing, another drain connection with the softener between the softening means and delivery end of the softener, valve means controlling both drain connections for simultaneously starting and stopping flow to the drain from the delivery end of the softener and through said other connection, and further valve means for regulating the relative flows to the drain from the delivery end of the softener and through said other connection.

13. A water softener having a water supply pipe and brine supplying means in connection with the receiving end of the softener and service and drain pipes in connection with its delivery end, valve means for controlling the admission of brine to the softener, valve means for controlling the discharge from the softener to the service pipe during normal softening operation and to the drain pipe during regeneration and flushing, another drain connection with the softener between the softening means and delivery end of the softener, valve means controlling both drain connections for simultaneously starting and stopping flow to the drain from the delivery end of the softener and through said other connection, a third drain connection with the softener between the softening means and delivery end, and valve means controlling the last named connection to open when brine flows to the softener and to close when such flow ceases.

14. In a water softener having a circulation system for normally flowing water to be softened through the softener and for flowing regenerating solution and water successively through the softener for regeneration and flushing, a plurality of drain connections through which the softener may discharge during the regenerating operation, and means controlled to close a part of said connections when the flow of regenerating solution to the softener stops.

15. In a water softener having a circulation system for normally flowing water to be softened through the softener and for flowing regenerating solution and water successively through the softener for regeneration and flushing, a plurality of drain connections in communication with the softener during regeneration and flushing, and a common valve means controlling the same.

16. In a water softener having a circulation system for normally flowing water through the softener to a service pipe and for flowing regenerating solution and water successively through the softener to a drain for regeneration and flushing, valve means controlling said system, the valve means being normally set for softening operation, supplemental piping in connection with said system having normally closed relief valve means, and plunger means subjected to the pressure in said circulation system and supplemental piping and connected to said first mentioned valve means, said plunger means permitting flow of water therepast to the supplemental piping and operable upon opening of the relief valve means to set the first mentioned valve means for regeneration, said first mentioned valve means adapted to assume their original positions upon closure of relief valve means respectively governing respective first mentioned valve means.

17. In a water softener, a softening tank, a brine tank, piping connecting the softening tank with a source of water and with the brine tank, a valve normally positioned to prevent the flow of brine from the brine tank, plunger means connected to said valve and normally subjected to an equalized pressure of water flowing through said piping, there being a chamber for said plunger means in communication through or around the plunger means with the water piping at both sides of the plunger means, a relief valve for releasing pressure at one side of said plunger means, whereby the brine valve is opened upon opening of the relief valve, said brine valve being adapted to close by gravity upon closure of the relief valve.

18. In a water-softening apparatus of the character described in claim 17, a construction in which the said valve is a double acting valve normally opening a passage for flow of water to the softener and closing a passage for flowing brine to the softener and which in its reverse position closes said water passage and opens said brine passage.

19. In a water softener, a softening tank, a brine tank, and piping connecting said softening tank with a source of water and with said brine tank, the said piping comprising a water pipe having branches in communication with the softening tank, one of said branches embodying a brine injector, a brine pipe leading from the brine tank to said injector, and a double acting valve normally opening the passage to the softening tank through the other water pipe branch and closing the brine pipe, said valve in its reverse position closing the passage through said other water pipe branch and opening the brine pipe for delivering brine to the injector.

20. In a water softening apparatus, a tank for base exchange material, a system of conduits including connections from said tank to a hard water supply, a source of regenerating material, a drain and a point of use, valve means controlling the flow through said connections, operating means for said valve means, a pair of electrodes adapted to control said valve operating means, means in said system of conduits for directing past the electrodes a portion of the fluid flowing from the base exchange material to the drain, and means for causing said portion to flow past the electrodes sometime after the remaining portion reaches the drain.

ANDREW J. DOTTERWEICH.